June 10, 1958   W. T. WAGNER   2,837,769
METHOD FOR MANUFACTURING CLOSURES
Filed Sept. 1, 1953
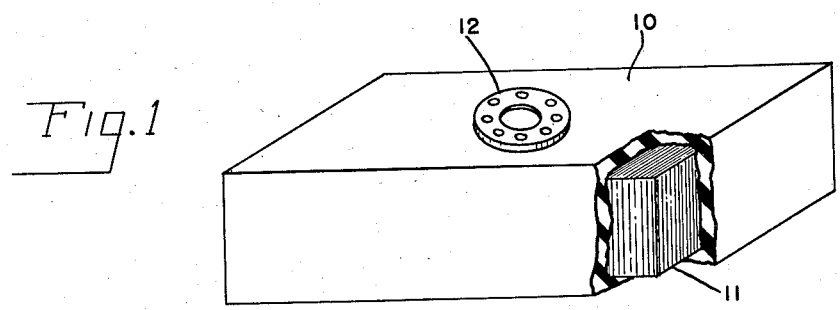
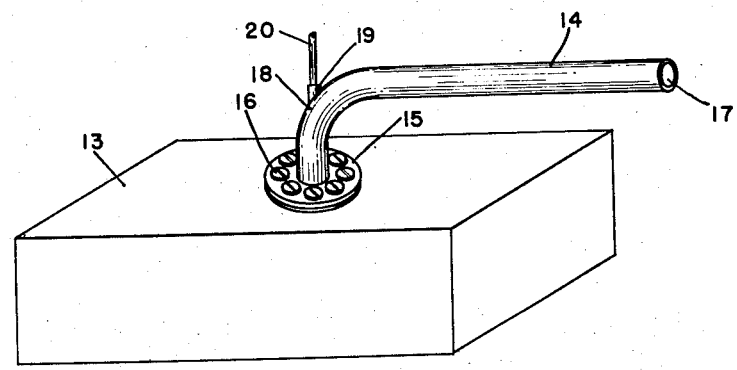
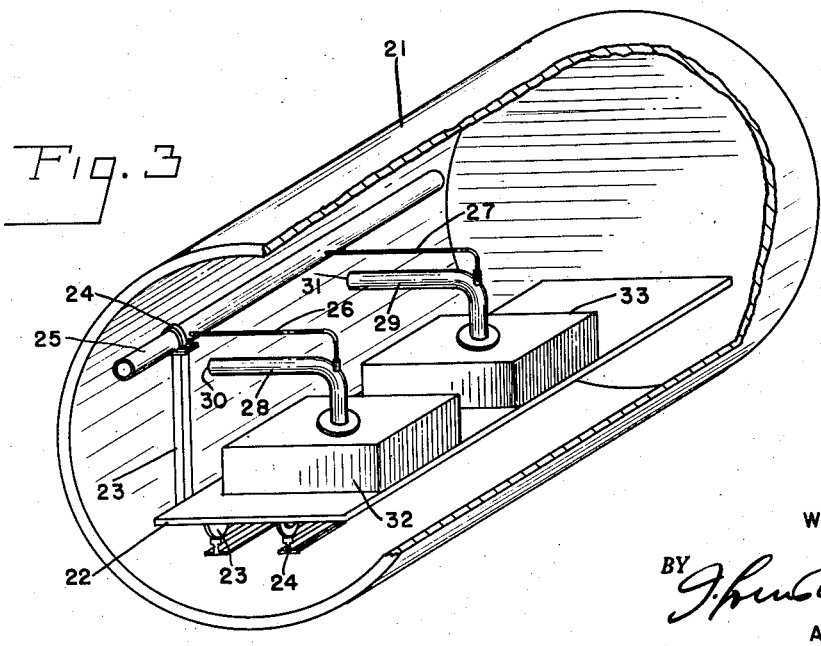
INVENTOR.
W. T. WAGNER
ATT'Y.

United States Patent Office 2,837,769
Patented June 10, 1958

2,837,769

METHOD FOR MANUFACTURING CLOSURES

William T. Wagner, Dayton, Ohio, assignor to The Dayton Rubber Company, a corporation of Ohio Application September 1, 1953, Serial No. 377,954

6 Claims. (Cl. 18—53)

The present invention relates to a method for the manufacture of flexible-walled closures and in particular, to closures composed of a vulcanizable material such as are used for fuel cells in aircraft.

In the manufacture of flexible walled closures such as self-sealing or non-self-sealing fuel cells for aircraft, it is customary to employ a water disintegratable form upon and about which the material to form the walls of such closures is placed. The water disintegratable material employed in forms designed for this purpose is usually a paper mache, cardboard or similar substance. The material employed for the formation of the closure itself is usually a vulcanizable material which may be reinforced with fabric, certain resinous compositions, or other strength materials. Typical of the vulcanizable materials employed in the manufacture of fuel cells for aircraft are natural rubber, the various synthetic rubber-like or elastomeric compositions such as the butadiene-styrene copolymers known as Buna-S or GR-S, the butadiene-acrylonitrile copolymers known as Buna-N, GR-A or Hycar, the polychloroprenes (neoprene), butyl rubber and blends of these specifically enumerated compositions. The term "rubber" as used herein is intended to apply to both natural and synthetic rubbers and rubber-like materials.

For speed, economy and for general convenience of manufacture, once these vulcanizable materials have been built about the water disintegratable form, they are preferably vulcanized in chambers filled with live or saturated steam. In concluding the building process after the vulcanizable material has been cured upon the form thereby, assuming the configuration thereof, water is introduced into the closure where it comes in contact with the water disintegratable form so that the same is decomposed and may be easily removed through openings in the closure which are provided in the design thereof to receive fittings and connections of various types, depending upon the use to which the closure will be put.

In order that the expansion of the air and other gases within the closure as it becomes heated during the vulcanizing procedure will not cause excessive pressure upon the inside of its walls, it is necessary that the interior thereof be vented to the surrounding atmosphere of steam. The necessity for thus exposing the interior of the fuel cell or other closure to the steam atmosphere has given rise to considerable difficulty in that, as the vulcanizing steam enters the cell it is cooled and condenses with the result that the water disintegratable form becomes moistened and disintegrates before the vulcanization has proceeded far enough to fix the fuel cell and other closure in its finally desired shape.

It is accordingly an object of the present invention to provide a satisfactory method for the manufacture of flexible-walled closures.

It is a further object of the present invention to provide a method for the manufacture of flexible-walled closures wherein the closure is built upon a water disintegratable form and is vulcanized while about said form in an atmosphere of live or open steam.

It is a further object of the present invention to provide a method for the manufacture of flexible-walled fuel cells built about water disintegratable forms which forms are exposed to an atmosphere of open steam during vulcanization of the fuel cells wherein the water disintegratable forms will not become prematurely decomposed.

In order to achieve these and other obvious objects of the present invention which will be apparent from a reading of the following disclosure, it is proposed to provide a flow of air or other gaseous medium which is relatively free from moisture as compared to the open steam, which air will be so circulated within the fuel cell or other closure during the vulcanization thereof that, even though the interior of such closure be exposed to the surrounding steam atmosphere, such steam will not be able to enter the vents or passages that are provided for maintaining a substantially equal pressure between the interior and exterior of the closure. To provide this desired air flow and to render it effective in prohibiting the entrance into the closure of the form-damaging steam atmosphere, the vent or opening is provided with a pipe fitting extending from the vented opening in the closure. At a point upon this pipe member preferably removed from its opening into the steam atmosphere, is provided a second opening through which the dry air or other gaseous mediums may be introduced under a pressure slightly greater than the pressure of the atmosphere surrounding the closure, with the result that such forced air may circulate within the closure and pass out through the vent thus creating a certain amount of back pressure at the large opening of the pipe member thereby preventing steam from entering the same and condensing within the closure to the damage of the water disintegratable form. It is preferred, in order to provide the most efficient blocking of the entrance of steam into the closure, that the vent pipe be bent in elbow fashion and the forced gas inlet provided near the point of the actual bend and so directed that it will pass directly into that leg of the elbow leading directly to the closure.

For a detailed description of one preferred embodiment of the present invention reference may be had to the following detailed description and the drawings in connection therewith.

In the drawings:

Figure 1 is a view in perspective and partially broken away showing a typical flexible-walled closure and the water disintegratable form upon which it is built as contemplated by the present invention.

Figure 2 is a perspective of a flexible-walled closure and the bent tube and forced air supply as provided by the present invention.

Figure 3 is a view in perspective and partially broken away of a typical autoclave or steam chamber as it is equipped for carrying out the purposes of the present invention.

In Figure 1 reference number 10 designates generally a flexible-walled closure of vulcanizable material and 11 refers to the water disintegratable form about which this vulcanizable material is placed during the building process. Closures of this type, such as self-sealing or non-self-sealing fuel cells for aircraft are normally provided with one or more openings 12 to allow for connection of the various pipes and fittings which will be necessary when the closure is put into actual use. These openings are usually formed during the building process and additional cores or inserts are applied to the form so that the dimensional integrity of these openings will be maintained throughout the vulcanization of the closure. After this vulcanization, it is possible to remove the water disintegratable form after the same has been decomposed by exposure to water through these holes thus provided.

In keeping with the principles of the present invention and the providing of a vent or opening between the interior of the closure and the steam atmosphere surrounding the same, at least one of the openings to be provided in the final closure should be indexed so as to cooperate with a similarly located opening in the form itself so that an unrestricted passage for the flow of air or other gas from the interior of the cell to the surrounding steam atmosphere will be provided.

In Figure 2 there is shown a similar closure such as the fuel cell of Figure 1, this closure being designated by reference number 13 and having affixed thereto the tubular elbow member 14. This tubular member is preferably provided with a flange 15 at its mounting base, which flange is further adapted to receive fastening means such as screws or rivets 16, which may be cooperatively engaged by an apertured rim or fitting surrounding the opening which is provided in the cell. By the provision of this tubular member mounted as described and in registry with the cooperative opening in the cell and the form therewithin, a free flow of a gaseous medium is provided between the interior of the cell and the atmosphere surrounding the same through the opening 17 of this tubular member. At a point removed from this larger opening 17 and preferably in the vicinity of the bend 18 of the tubular member is located a second opening 19 which is adapted to receive the pipe or similar fitting 20 for the introduction into the closure through the tubular member at the opening 19 of a forced or compressed gaseous medium such as air, the relative humidity of which is less than that of the surrounding steam and sufficiently low so as to remain gaseous upon coming into contact with the water disintegratable form within the cell so that no water damage will be caused to the same. In this preferred illustration the fitting 19 allowing for the entrance of the forced dry air is located so that the air may pass directly into the fuel cell encountering the least possible resistance from the tubular member 14. This air so introduced will circulate within the enclosure and at the same time will create a sufficient back pressure at the opening 17 as to prevent the entrance of the steam thereinto.

Referring now to Figure 3 there is shown the manner in which several fuel cells may be subjected to vulcanizing temperatures in keeping with the principles of this invention. Within the steam chamber or autoclave 21 is positioned a table or rack 22 which is usually slideable or movable by means of wheels such as 23 upon rails 24 for the convenience of handling a plurality of these fuel cells. Also affixed to the table 22 by means of brackets such as 23 and clamping members 24 is a pressurized manifold 25 which is connected to the forced air from an outside source (not shown). From the manifold 25 extends a plurality of take-off tubes 26 and 27 which transmit the compressed air to the vent tubes 28 and 29 from which, in the manner described above in connection with Figure 2, this air passes into and circulates within the closures thereby creating the desired back pressure and preventing the entrance of steam into the closure through the openings of the pipe members 30 and 31. The air thus introduced will circulate through the cells 32 and 33 in the same manner and with the same desired results as explained above in connection with Figure 2.

The volume rate of air necessarily supplied to the interior of the cells such as 32 and 33 will depend, of course, upon the inside diameter of the pipe members 28 and 29 as well as the shape and the length thereof, upon the pressure within the steam vulcanizing chamber, and the manner in which this air is introduced into the cells. In any event, it is desirable to maintain a pressure difference of from about one to five pounds per square inch, the greater pressure being within the cells or closures so that the steam which is under a lesser pressure will not be able to enter these closures. A constant pressure within the autoclave itself is maintained by means of pressure relief valves normally provided to allow for the introduction of fresh steam. Such valves will, of course, also compensate for the gas which is introduced into the interior of the cells and passes therefrom into the autoclave proper via the pipe members such as 28 and 29.

Since once the cells have become heated to approximately the same temperature as the steam atmosphere surrounding them, the tendency of the steam in that atmosphere to condense and to cause damage to the water disintegratable forms therewithin will be considerably reduced; the compressed air flow within the closures may be stopped before the vulcanization is completed.

While in the foregoing illustration particular constructions and details were set forth, it is to be understood that this description is for purposes of illustration only and is not intended to limit the scope of the present invention as defined by the sub-joined claims.

I claim:

1. A method for manufacturing closures wherein vulcanizable material is built about a water disintegratable form, subjected to vulcanizing conditions in a fluid atmosphere and the forms thereafter disintegrated and removed from the vulcanized closure, that improvement whereby premature disintegration of the form during vulcanization is prevented and the configuration of the closure is maintained until it has been fixed by vulcanization which comprises introducing a forced relatively dry gaseous medium into the closure to prevent entrance thereinto of the vulcanizing fluid.

2. A method for the manufacture of fuel cells comprising building a cell formed of composite rubber layers about a water disintegratable form, the dimensions of which conform to the interior dimensions of the cell, vulcanizing the cell while supported by the form therewithin in an atmosphere of steam, and introducing relatively dry air into the cell during the vulcanization thereof at a rate capable of maintaining a pressure therewithin which is at least equal to the pressure of the steam atmosphere surrounding the same, whereby contact of the steam with the form and premature disintegration of the latter are prevented.

3. A method for the manufacture of fuel cells according to claim 2 wherein the pressure within the cell is from about one to five pounds per square inch greater than the pressure of steam atmosphere surrounding the same.

4. In a method for the manufacture of fuel cells comprising building a cell formed of sheet rubber material about a water disintegratable form, vulcanizing the cell while supported by said form, and introducing relatively dry air into the cell during the vulcanization thereof, that improvement which comprises venting the interior of the cell to the steam atmosphere surrounding the same and introducing into this same vent a supply of forced relatively dry air.

5. A method for the manufacture of fuel cells comprising building a composite rubber containing closure about a water disintegratable form, venting the interior of the cell and the form therewithin to the surrounding atmosphere by means of an opening through said cell and said form and a pipe member associated therewith, vulcanizing the cell thus vented while supported by the form therewithin in an atmosphere of open steam, and injecting a supply of forced relatively dry air into the cell and the form therewithin at a point on said pipe member removed from the opening thereof.

6. A method for vulcanizing a closure formed of a vulcanizable rubber material while supported on a water disintegratable form in a moisture containing atmosphere which comprises venting the interior of the form within the closure to the surrounding atmosphere and introducing a dry gaseous medium into the form whereby sufficient pressure is created within the form to prevent the entrance thereinto of the moisture containing atmosphere.

References Cited in the file of this patent

UNITED STATES PATENTS

| | | |
|---|---|---|
| 676,350 | Bourn | June 11, 1901 |
| 1,048,138 | Duncan et al. | Dec. 24, 1912 |
| 1,269,229 | Smith | June 11, 1918 |
| 1,722,697 | Glidden et al. | July 30, 1929 |
| 1,808,428 | Minor | June 2, 1931 |
| 2,394,492 | Scharenberg | Feb. 5, 1946 |
| 2,413,497 | Heymann | Dec. 31, 1946 |
| 2,428,944 | Schrank | Oct. 14, 1947 |